Figure 1:
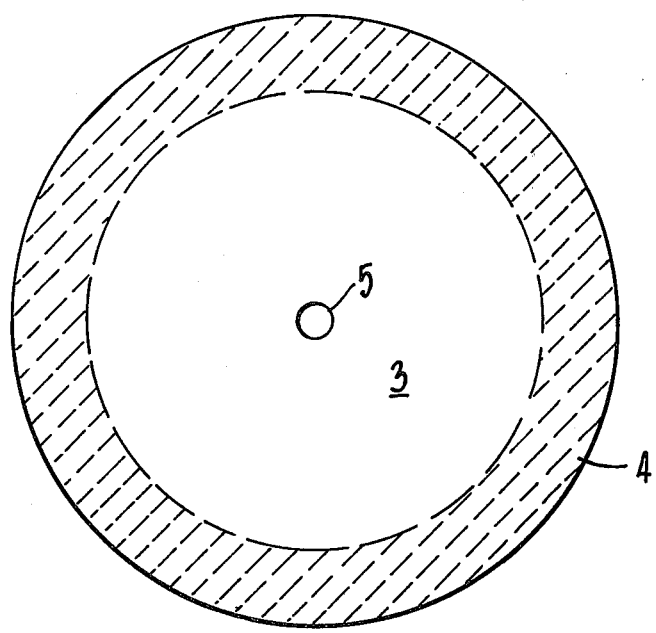

United States Patent [19]

Johnson

[11] 4,305,272
[45] Dec. 15, 1981

[54] AGRICULTURAL DISCS

[75] Inventor: William M. Johnson, Melton South, Australia

[73] Assignee: Ralph McKay Limited, Maidstone, Australia

[21] Appl. No.: 27,255

[22] Filed: Apr. 5, 1979

[51] Int. Cl.³ .............................................. B21K 19/00
[52] U.S. Cl. ...................................... 72/342; 72/364; 148/148
[58] Field of Search ................ 172/604; 148/131, 148, 148/149; 72/342, 364

[56] References Cited

U.S. PATENT DOCUMENTS

| 153,115 | 7/1874 | Robinson | 148/131 |
| 488,514 | 12/1892 | Arnold | 172/604 |
| 1,293,078 | 2/1919 | Fulton | 148/148 |
| 2,326,126 | 8/1943 | Dimmick | 148/148 |
| 2,327,129 | 8/1943 | Ronan | 148/149 |
| 2,416,742 | 3/1947 | Farr | 172/604 |

Primary Examiner—Lowell A. Larson
Attorney, Agent, or Firm—Christel, Bean & Linihan

[57] ABSTRACT

Agricultural discs are given a hardened annular run by providing a differential heat treatment. During the heat treatment step an annular ring of heat conductive material is placed on the outer periphery of the disc. Thus ensures that the outer edge is of greater hardness than the central portion of the disc.

1 Claim, 2 Drawing Figures

AGRICULTURAL DISCS

This invention relates to improved agricultural discs.

With the common use of high horse power tractors greater stress has been placed on the earth engaging implements which as a consequence must withstand greater wear and greater deformation forces. Modern agricultural machinery is driven at a higher speed in operation than was the case previously and as a result is the aforementioned stress on earth engaging tools.

In order to reduce the wear rates on tillage discs it has been proposed to weld hard facing on the outer periphery of the tillage discs and this proposal has been successful in increasing the discs resistance to wear. However, it has no effect on the resistance to deformation offered by the disc. A disadvantage of this proposal is the high cost and the lengthy production time required to produce these hard faced discs.

It is an object of the present invention to provide discs of improved wear resistance which are cheaper to produce than conventional hard faced discs.

To this end the present invention provides a method of forming tillage discs comprising heating disc-shaped blanks, shaping the discs in a press to their three dimensional form, subsequently hardening the discs by quenching and subsequently introducing the discs into a tempering furnace with an annular ring of heat conductive material placed about the periphery of the disc under tempering conditions such that the central portion of the disc acquires a desired degree of hardness and the outer peripheral portion acquires a hardness value higher than the central portion. The resulting discs have an annular peripheral region of greater hardness than the central portion of the disc.

The wear resistance of the discs is greater than that of conventional discs. However, a surprising finding is that these discs are able to withstand deformation forces of a higher order than can be withstood by conventional discs. A standard deformation test is to drop a given weight from a set height on to the exposed edge of a disc and to repeat the treatment a given number of times. In tests of this kind the discs incorporating a harder periphery demonstrate greater resistance to deformation than conventional discs of equivalent material.

This advantage makes it feasible to manufacture discs of a thinner gauge yet exhibit better wear resistance and equivalent deformation resistance to conventional discs of thicker gauge. Because the cost of the steel sheet from which the discs are made form a significant portion of the retail price of the discs, a reduction in cost can be made by using the present invention.

In order to produce the discs of this invention the conventional procedure is followed in which the blanked discs are heated, shaped in a press to form their three dimensional shape, heated again in a furnace and quenched in an oil bath to effect hardening. According to this invention the disc is placed in a tempering furnace in conjunction with an annular ring of metal which lies on the periphery of the disc. The central portion of the disc is tempered to the desired hardness of conventional discs. Because the metal ring acts as a heat sink, the peripheral region retains a greater degree of its original hardness than the central portion. Further as mentioned above the peripheral region acquires a resilience which provides it with improved resistance to deformation.

Figure 2:
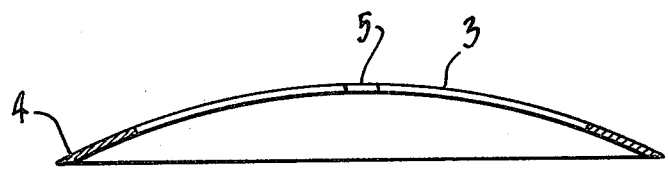

FIG. 1 illustrates a plan view disc having a hardened periphery and FIG. 2 illustrates a sectional view of the disc of FIG. 1.

The hardened periphery 4 of the disc 3 is shown by the shading in the drawings. To produce the differential hardening an annular ring of metal is centered on the hole 5 of the disc 3 and seats on the peripheral portion 4 of disc 3. The disc and annular ring are then placed in the tempering furnace and the tempering operations are carried out in the conventional manner except for the presence of the ring. The size and heat capacity of the annular ring are selected to produce the desired hardness differential between the central and peripheral areas of the disc.

I claim:

1. A method of forming tillage discs comprising heating disc-shaped blanks, shaping the discs in a press to their three dimensional form, subsequently hardening said discs by quenching, and characterized by introducing said discs into a tempering furnace with an annular ring of heat conductive material placed about the periphery of the disc, operating said furnace to heat said disc and said ring under tempering conditions, and said ring serving as a heat sink during said tempering conditions such that the central portion of said disc retains a desired degree of hardness and said outer peripheral portion retains a hardness value higher than said central portion.

* * * * *